United States Patent

[11] 3,589,558

| [72] | Inventors | Evgeny Alexandrovich Belyaev<br>Unchinskaya ulitsa, 3, kv. 50, Moscow;<br>Leonid Efinovich Katsnelson, 16,<br>Parkovaya ulitsa, 49, Korpus 2, kv. 17,<br>Moscow; Alexei Alexeevich Terekhin, ulitsa<br>Mikhailova, 30, kv. 8, Moscow; Sergei<br>Petrovich Volkov, Sretensky bulvar, 6/1.<br>kv, 161, Moscow; Leonid Nikolaevich<br>Filipiev, Obryvnoi pereulok, 11,<br>Kirovograd; Anatoly Vladimirovich<br>Bozhor, ulitsa Vorovskago, 91, Kirovograd;<br>Mikhail Pavlovich Odegnalov, ulitsa<br>Frunze, 14, kv. 36, Kirovograd; Nikolai<br>Ignatievich Jubushko, ulitsa Oktyabrskaya,<br>27, kv. 18, Dolgoprudny, all of, U.S.S.R. |
|---|---|---|
| [21] | Appl. No. | 805,184 |
| [22] | Filed | Mar. 7, 1969 |
| [45] | Patented | June 29, 1971 |

[54] SOWING APPARATUS FOR DRILLS
5 Claims, 3 Drawing Figs.

[52] U.S. Cl. ................................................ 221/266,
111/77, 222/318

[51] Int. Cl. ...................................................... B65g 59/12,
B65h 3/00
[50] Field of Search ............................................ 221/266;
222/176, 318; 111/77

[56] References Cited
UNITED STATES PATENTS

| 2,871,805 | 2/1959 | Behnen .......................... | 221/266 X |
| 3,272,400 | 9/1966 | Van Huis ...................... | 222/318 |

Primary Examiner—David M. Bockenek
Attorney—Waters, Roditi, Schwartz & Nissen

ABSTRACT: A sowing apparatus for drills, in which the working member is fashioned as a ring with inner ribs and is disposed in the body made so that it is possible to relieve the apparatus and the seed hopper of the seeds. To effect this, at least one of the body walls enveloping the ring from the side face is made composite, and at least one of the component parts of the wall is made movable.

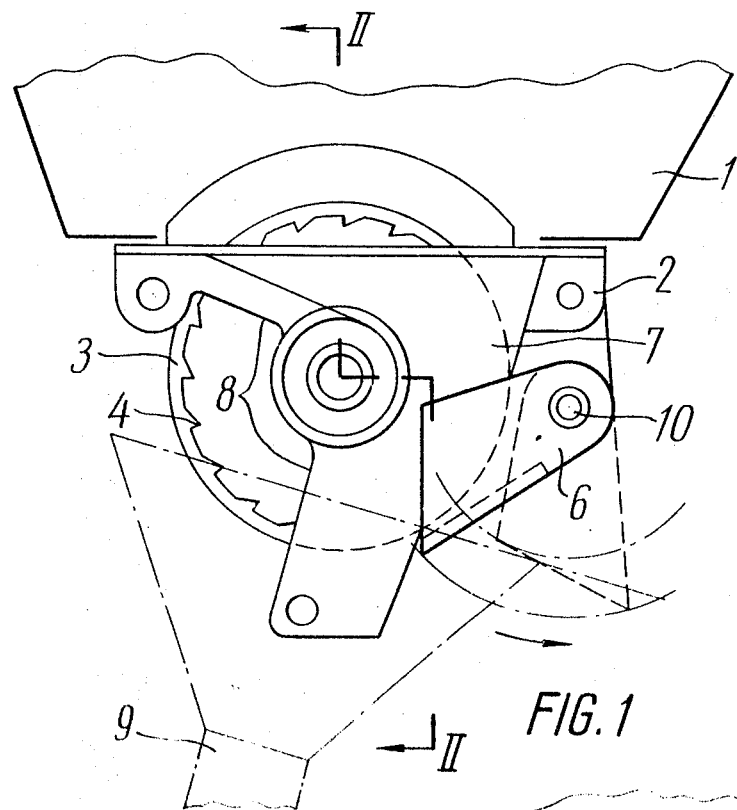
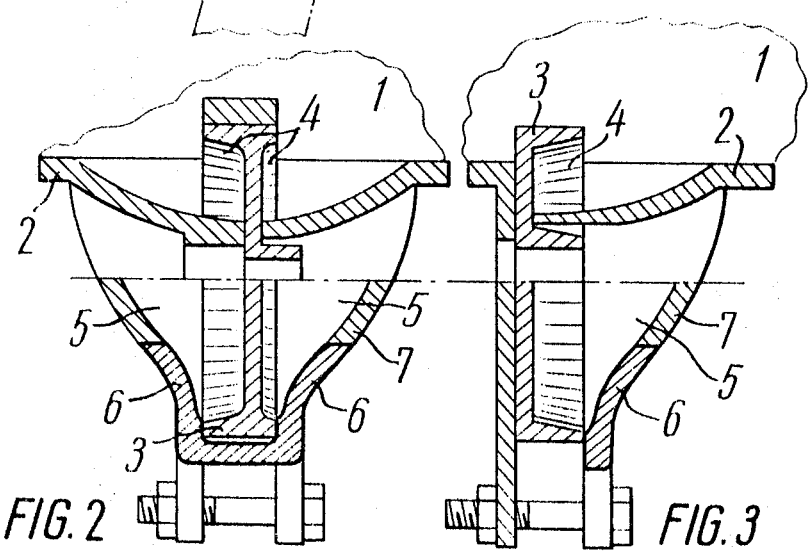
FIG.1
FIG.2
FIG.3

SOWING APPARATUS FOR DRILLS

DETAILED DESCRIPTION

The present invention relates to drills for drill seeding of farm crop seeds and, more particularly, to sowing apparatus for use in such drills.

Known in the prior art are sowing apparatus for use in drills whose body houses a working member made, for instance, as a coil with riffles or a drum with pins.

Disposed in the lower portion of the body of such apparatus is a turnable bottom providing for a simultaneous relief of the body of the apparatus and the seed hopper of the drills of the seeds.

To sow diverse farm crop seeds, however, the sowing apparatus, which have their working member fashioned as a coil with riffles, are made of different types and dimensions, whereas the sowing apparatus, in which the working member is made as a drum with pins, is provided with a set of removable working members. Since, in the course of sowing carried out by such apparatus, seeds are thrown out mainly positively by way of being drawn by the working member through the space between the body stationary portion and the working member proper, they may be crushed and sowed in a nonuniform manner.

Also known in the prior art are sowing apparatus for drills, which, as compared to the aforedescribed ones, are more universal inasmuch as they provide for sowing diverse farm crop seeds without the replacement of both the apparatus as a whole and its working member.

The body of such apparatus houses a working member made as a ring with inner ribs. Such apparatus provide for a better quality of operation (there occur no crushing of seed and partial sowing), for the seeds are thrown out of the apparatus body by self-sliding directly off the working member. In spite of the aforesaid advantages of these apparatus over the above-described ones, their employment, however, is limited as they have no device for individual and group relief of the body of the apparatus and the seed hopper of drills of the seeds. This device is especially necessary when carrying out sowing on small private or farm strips and selection plots, since a quick and easy relief of the seed hopper of the seeds when changing the farm crop seeds to be sowed provides for a higher efficiency of labor. Apparently, this is due to this fact that sowing apparatus having their working member made as a ring with inner ribs are substituted now with apparatus which are less universal and provide for a lower quality of operation, but are necessarily equipped with a device for effecting the group relief.

The problem of the individual and group relief of the sowing apparatus whose working member is fashioned as a ring with inner ribs has not yet been solved.

The object of the present invention is to provide a sowing apparatus with a working member made as a ring with inner ribs, which will provide for both individual and group relief of its body and the drill seed hopper of the seeds, without lowering the quality of the apparatus operation.

In the accomplishment of said and other objects, in a sowing apparatus whose body houses a working member made as a ring with inner ribs, according to the invention, at least one of the body walls enveloping the sidewalls is made composite, at least one of the component parts thereof being made movable.

With the wall of the apparatus body being composite, it is possible, at the point of the most intensive outflow of the seeds, to turn one of its portions by any known means, as a result of which there is formed an aperture through which seeds can pour out to empty the body of the apparatus and the seed hopper of the drill.

To effect, for example, a turn of the movable portion of the body wall, it is expedient to secure the movable portion on a turning axle mounted in the body.

With at least one of the body walls enveloping the working member at the sidewalls made composite and one of the portions of these walls movable, it has become possible to solve the problem of relieving the sowing apparatus of the seeds.

Other objects and advantages of the present invention will become apparent upon consideration of the following description of its exemplary embodiments given with reference to the accompanying drawings, in which:

FIG. 1 is a side view of the sowing apparatus according to the invention;

FIG. 2 is a section on the line II–II of FIG. 1; and

FIG. 3 shows the sowing apparatus with another embodiment of the working member, according to the invention, in cross section.

Secured under seed hopper 1 (FIG. 1) of a drill is a sowing apparatus comprising body 2 which houses the working member made as a ring 3 with inner ribs 4. The upper rear portion of the body 2 is somewhat spaced from the ring 3 to form cavity 5 (FIG. 2) for the accumulation of seeds.

The walls of the body 2 enveloping the ring 3 at the sides are made composite, each of the walls consisting of two portions 6 and 7, of which portion 6 is movable and portion 7 is stationary. The portion of the body wall disposed at the point of the most intensive flow of the seeds out of the body is the movable portion 6.

In case the working member is made as the ring 3 having the inner ribs 4 provided at its two side faces (as shown in FIG. 2), it is two walls of the body that are made composite, each of the walls enveloping such a ring at its side face.

Passed through the stationary portions 7 of the walls of the body 2 is a drive shaft (not shown in FIGS. 2, 3) having the ring 3 secured thereon, each stationary portion 7 of the wall having a shaped slot 8 (FIG. 1) through which the ring 3 extends from the body 2. With the ring 3 rotating, the inner ribs 4 grab the seeds and convey them through the shaped slot 8 outside the body 2. The seeds are poured into delivery tube 9, disposed under the apparatus, and therefrom fall under gravity into the drill coulters (not shown in the drawings) moving in the soil.

The movable portion 6 of the body walls are secured on turnable axle 10 mounted in the body 2. To relieve the body 2 and the drill seed hopper 1 of the seeds, it is necessary to turn the axle 10, as a result of which the movable portions 6 of the body walls secured on said axle turn together with the latter and the seeds are poured through apertures formed in the body 2 into the delivery tube 9 (the movable portion 6 is shown in its turned position by the chain-dotted line in FIG. 1).

In case the body 2 houses the ring 3 with the inner ribs 4 on one of the side faces of ring 3 (as shown in FIG. 3), it is the face of the body which envelops the ring at the side provided with the inner ribs 4, i.e., the one which effects sowing, that is made composite.

Since the drill has not one but several sowing apparatus secured thereon, it is usually not the body of every sowing apparatus that is separately relived of the seeds, but the bodies of the whole group of the sowing apparatus simultaneously. To effect this, the turnable axle 10 is mounted so as to freely pass through the bodies of all the apparatus, and all the movable portions of the bodies of all the apparatus are turned during one turn of said axle.

The turnable axle 10 may be mounted not only in the body of the sowing apparatus but also on the drill brackets (not shown in FIGS. 1, 2, 3), as well as with the aid of any other known means.

The movable portions 6 of the body walls of each apparatus may be made both as separate parts or as a single part enveloping the ring not only from the sides but also from below, as shown in FIGS. 1 and 2.

Thus, the sowing apparatus having the working member made as a ring with inner ribs may be relieved of the seeds both individually and by groups, this in no way affecting the quality of operation of the sowing apparatus since, when closed, the movable portions of the body do not change the internal surface of the body of the sowing apparatus.

The sowing apparatus operates as follows. Seeds are poured into the seed hopper 1 (FIG. 1) of the drill, and are delivered therefrom into the body 2 of the sowing apparatus. With the drill moving, the ring 3 starts rotating and by its inner ribs 4 grabs the seeds in the body 2 and conveys them through the shaped slot 8 outside the body, whereupon they are freely poured into the delivery tube 9.

When the seeds are to be changed or the seed hopper is to be relieved of the seeds, it is only necessary to turn the axle 10, as a result of which the movable portions 6 of the body will turn too, and the seeds will freely pour out through the aperture thus formed to effect the relief of the drill seed hopper and the body of the apparatus.

What we claim is:

1. A sowing apparatus for drills comprising a seed hopper adapted for containing seeds, a body beneath said hopper for receiving seeds therefrom, a working member in said body and constituted as a rotatable ring with inner ribs thereon, a delivery tube disposed beneath said body and ring to receive seeds conveyed by the ring and passed through a slot provided in said body, said body including a fixed wall portion and a movable wall portion, and means for moving the movable wall portion from a position adjoining the fixed wall portion in which it is continuous therewith and forms a closed body, to a position displaced from the fixed wall portion to define an aperture therewith through which seed in the hopper and body can freely escape to the delivery tube.

2. A sowing apparatus as claimed in claim 1 wherein said movable wall portion embraces said ring from below.

3. A sowing apparatus as claimed in claim 1 wherein means for moving the movable wall portion comprises a turnable axle supporting said movable wall portion.

4. A sowing apparatus as claimed in claim 1 wherein said inner ribs extend on opposite sides of said ring, and said movable wall portion embraces said ring on the opposite sides thereof.

5. A sowing apparatus as claimed in claim 1 wherein said inner ribs extend on one side of said ring, said movable wall portion facing said ribs.